Jan. 12, 1937.  W. L. BENNINGHOFF  2,067,593
TOOL FOR CUTTING THREADS
Filed April 6, 1934

INVENTOR:
William L. Benninghoff
BY Ray S. Erb
ATTORNEY

Patented Jan. 12, 1937

2,067,593

UNITED STATES PATENT OFFICE 2,067,593

TOOL FOR CUTTING THREADS

William L. Benninghoff, Cleveland, Ohio

Application April 6, 1934, Serial No. 719,256

10 Claims. (Cl. 10—145)

The invention relates more particularly to tools for cutting taper threads such, for example, as those commonly formed on pipes or tubes for the purpose of uniting sections thereof.

In the cutting of taper threads, especially where the taper is relatively great and the threads fairly coarse, marked difficulty has heretofore been encountered in producing threads that are well formed and smoothly finished. It is, of course, necessary in forming such threads that the cutter or cutters do the forming by a number of successive cuts to avoid tearing the metal and subjecting the cutter to excessive loads. I have discovered that one of the principal difficulties encountered in the use of prior tools for cutting taper threads is often due to the fact that one or more of the cutter teeth which cut successively deeper into the work to form the thread is or are designed to cut a portion of the thread contour to substantially finished form. In the use of such cutters the cutting teeth ordinarily have sharp corners which become dulled with the result that the metal removed by the tooth, particularly if the cut is relatively heavy, tends to pile up on the corner and gouge into the work sufficiently to leave deep scratches in the surface of the finished thread. I have also found that a further cause of rough or imperfect finish of taper threads as heretofore formed is the use of a finishing cut of too great depth so that the metal is torn and not smoothly cut.

The main object of the present invention is to provide a tool for forming taper threads in which the foregoing difficulties are overcome and by means of which taper threads closely approximating ideal form and smoothness of finish can readily be produced.

A further object of the invention is to provide an improved cutter adapted to more or less compensate for inaccurate mounting thereof so as to avoid the rough and inaccurate forming of the thread that would otherwise result from such mounting.

Other objects more or less ancillary or incidental to those stated will be apparent and understood from a consideration of the following description.

With the first of the above objects in view, in carrying out my present invention I overcome the first of the two difficulties mentioned above by so forming the cutter or cutters employed that the thread is brought approximately, but not completely, to finished form in any part of its contour by a series of cutter teeth which lead the finishing tooth or teeth and are formed to penetrate successively deeper into the work and make cuts sufficiently light to prevent metal piling up on the cutting edges of the teeth and gouging through the contour of the finished thread and with the last tooth of the series closely approaching the finished contour of the thread without reaching any part thereof, so that only an exceedingly light cut need then be made to bring any part of the thread contour to its final or finished form. And to avoid the second difficulty or cause of rough finish, above mentioned, I utilize retractible cutters which, in the operation of forming the thread, are fed in relation to the work on lines parallel to the taper of the thread and thus, regardless of how great the taper may be, I am enabled to make the final finishing cut sufficiently light to insure a smooth finish and an extremely close approximation to the perfect contour of the thread.

To attain the second of the above mentioned objects of my invention, I provide the cutter with one or more supplementary teeth whereby it is adapted to effect a final or finishing cut in a manner to compensate for certain inaccuracies in the mounting of the cutter.

My invention can be embodied in tools differing widely in construction. The tool may be in the form of a tap to cut internal threads or in the form of a die to cut external threads. The cutter or cutters may be rotated in relation to the work or the work may be rotated in relation to the cutters and the cutters may take various forms including flat, tangential and circular chasers. For purposes of illustration and explanation I have shown my invention in the accompanying drawing embodied in a tap utilizing flat chasers and adapted to cut the internal threads of a pipe coupling or the like.

In the drawing Fig. 1 is a vertical axial section of the main parts of a tool embodying the invention together with a pipe coupling on which threads are being formed.

Figure 1:
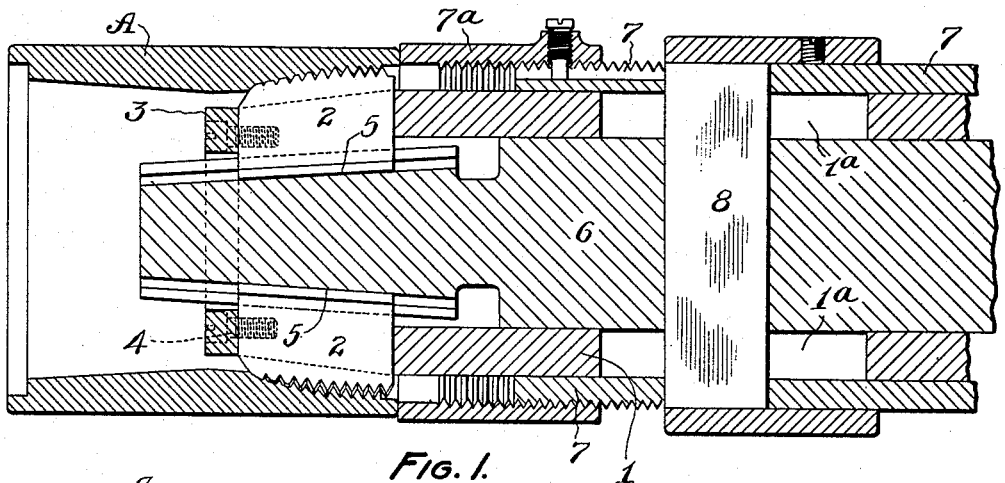

Referring in detail to the construction illustrated, 1 is the tubular main body or stock of the tool which is adapted to be movably mounted on the frame of a suitable machine, such for example as a machine of the lathe type, so as to be fed toward and retracted from the pipe coupling A which may be gripped in the usual rotating chuck (not shown) of the machine. The front end of the stock 1 is formed with a plurality of radial slots in each of which is slidably mounted a cutter 2, the width and length of the slots corresponding to the thickness and length of the cutters and the latter being held against endwise displacement by a ring 3 secured to the stock 1 by suitable screws 4. Any suitable number of cutters can be employed. At their inner sides the cutters 2 have a tongue and groove engagement at 5 with the tapered end of a plunger 6 which is slidably mounted in the stock 1. In the construction illustrated the taper of the end section of the plunger corresponds to the taper of the thread which it is desired to form upon the work. On the cylindrical outer surface of the stock 1 is slidably mounted a sleeve 7 which is rigidly connected to the plunger 6 by a transverse bar 8 which extends through slots 1a of the stock 1. The front end of the sleeve 7 is threaded to receive an adjustable threaded ring 7a which is designed to engage the pipe coupling A or other work being threaded, as indicated in Fig. 1. Consequently, in the operation of the tool, as the stock is fed forward in relation to the coupling A the sleeve 7, and consequently also the plunger 6, are prevented from moving forward with the stock by reason of the engagement of the sleeve ring 7a with the work, so that the cutters 2 in advancing in relation to the work also advance in relation to the tapered end of the plunger 6 with the result that the cutters are fed forward in relation to the work on lines parallel to the taper of the thread formed on the work.

Figure 2:
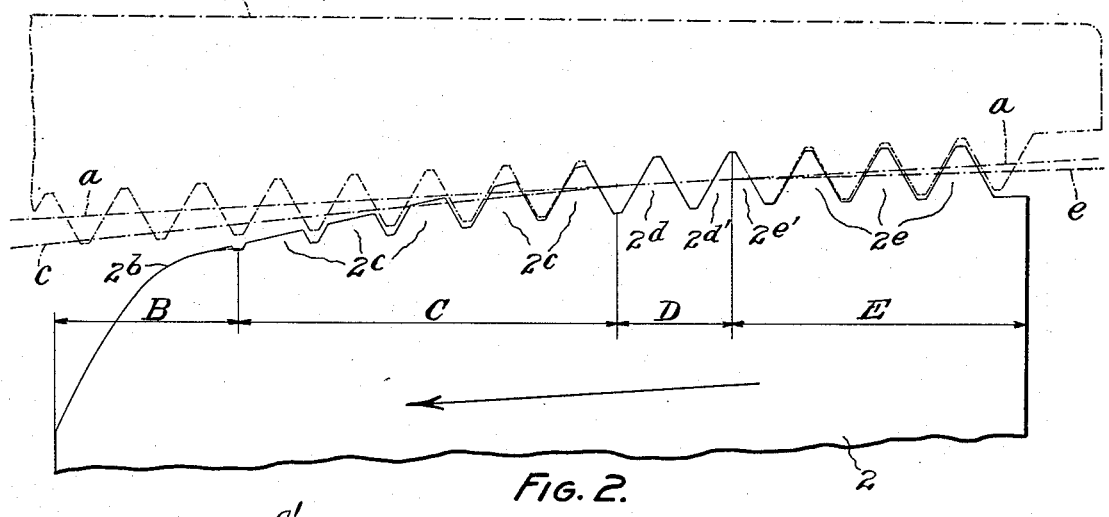
Fig. 2 is a fragmentary side elevation of one of the cutters on a greatly enlarged scale for the purpose of more clearly showing the construction, the sectional outline of the thread formed by the cutter being indicated by broken lines.

One of the cutters 2 is shown on an enlarged scale in Fig. 2. For purposes of explanation a fragment of the pipe coupling A is shown by the broken lines in sectional outline with the thread thereof in finished form, the pitch line of the finished thread being indicated at a. The cutter 2 may be considered as divided longitudinally into four zones B, C, D, and E. The zone D has one tooth 2d and a half tooth 2d' which correspond in size and form to the finished form of the thread and are themselves formed upon a pitch line coincident with the pitch line a of the finished thread.

The zone C of the cutter has a series of teeth 2c which are formed on a pitch line c that is inclined toward the axis of the cutter forward and away from the pitch line a of the teeth 2d. These teeth 2c furthermore are truncated on a line which also inclines forward and inward in relation to the pitch line a. In advance of the lowest and foremost one of the teeth 2c the cutter is formed with a continuous cutting edge 2b, that portion of said cutting edge immediately in advance of the leading tooth 2c being in line with the truncated top of said tooth. The zone E of the cutter is formed with a series of teeth 2e and a half tooth 2e' which are of the same form and size as the tooth 2d and the half tooth 2d', respectively, but are formed on a pitch line e which inclines toward the axis of the cutter rearward and away from the pitch line a.

The significance of the form and arrangement of the teeth of the cutter 2 will better be appreciated from a consideration of the operation of the cutter.

In the operation of the tool, with the feed of the machine set in accordance with the pitch of the thread to be cut and with the plunger 6 fully extended in relation to the tool stock 1 and the cutters 2 correspondingly fully expanded, the tool is advanced to bring the front ends of the cutters into contact with the coupling A to be threaded, said coupling as previously indicated being gripped in the rotating chuck of the machine. The ring 7a of the sleeve 7 being then adjusted into contact with the coupling A and the machine being started, the cutters 2 are advanced against the work by the movement of the stock 1 and are meanwhile retracted inward by reason of the fact that the plunger 6 is held against advancement by the sleeve structure 7, 7a and bar 8 so that the cutters are drawn inward by their tongue and groove connection with the tapered end of the plunger. In this manner a taper thread is cut in the coupling A and as the taper of the thread corresponds to the taper of the plunger 6 the path of movement of each of the cutters 2 is parallel to the taper of the thread. The arrow in Fig. 2 indicates the direction of the cutter feed.

Because of the peculiar form of the cutters 2 their action is distinctive. As the cutters advance against the work the cutting edge 2b gradually enters the work and removes the surplus metal of the coupling to such a depth that the lowest of the truncated teeth 2c makes a cut of but moderate depth. As the cutters progress into the work the succeeding, successively higher teeth 2c engage the work, each tooth cutting beyond the bounds reached by the preceding teeth. From an inspection of Fig. 2 it will be apparent that the teeth 2c from left to right approach more and more closely the finished contour (i. e. cross-sectional form) of the thread to be formed on the coupling A, the last tooth 2c at the right of the series approaching relatively closely to this finished contour without fully reaching it at any point. Since said last tooth 2c itself makes a light cut, the piling up of metal on the corners or other cutting edges of the tooth and the resultant gouging through the contour of the finished thread, are avoided. Furthermore, since the said tooth 2c closely approaches the finished thread contour, the finishing tooth or teeth of zone D are required to make only very light cuts so that tearing of the metal and piling up of metal on the cutting edges of the said tooth or teeth with resultant gouging through the true contour of the finished thread, are avoided. For the reasons stated, scratching or gouging through the true finished contour of the thread by any of the teeth of the zone C, as well as of zone D, is completely avoided; and since the final finishing cut effected by the teeth of zone D is very light, an exceedingly close approach to the true contour and a very smooth finish is secured. Furthermore, this exceedingly light finishing cut effected by the tooth or teeth of zone D can be secured no matter how great the taper of the thread may be since the cutters are fed forward on lines parallel to the taper and the difference in penetration between the highest of the cutter teeth 2c and the tooth or teeth 2d, 2d' which effect the finishing cut can be made as small as desired, the design of the cutter being in this respect independent of the taper of the thread.

It is to be observed that the location of the boundary between the roughing zone C and the finishing zone D of the cutter is affected by the method employed in forming the cutter teeth. Thus, by one known method of forming said teeth such boundary is established at the cutter teeth root between the highest tooth 2c and the next adjoining tooth 2d, as shown in Fig. 2. However, by another known method of generating the finishing teeth, that is by the use of a cutting tool which is designed at each operation to simultaneously form the adjacent sides of two finishing teeth of the zone D, it will be seen that such cutting tool in forming the leading side of the tooth 2d will at the same time form the trailing side of the highest tooth 2c and give that side of the tooth 2c a form corresponding to the finished contour of one side of the thread to be formed by the cutter. Thus, by such method of generating the cutter teeth the highest of the series of teeth 2c, by virtue of the form of its trailing side, is made a finishing tooth; and, as compared with the construction shown in Fig. 2, the boundary between zones C and D would be moved forward at least to the middle of the highest tooth 2c. However, inasmuch as the latter tooth, if the cutter is formed in accordance with my invention, makes a very light or moderate cut, the tearing of the metal by said tooth and piling up of metal on the corners or other cutting edges of the tooth, with resultant gouging through the true contour of the finished thread, are avoided; and, with either method of forming the cutter teeth, the full size tooth or teeth of the zone D are called upon only to make a finishing cut that is exceedingly light, so that tearing of the metal and the piling up of metal on the cutting edges of the said tooth or teeth with resultant gouging through the true contour of the finished thread, are practically completely prevented.

It is further observed that where use is made of a number of cutters spaced apart circumferentially of the tool, the respective teeth of each cutter are offset axially in relation to the corresponding teeth of other cutters so as to effect the customary spiral tracking of the teeth, as will be seen from a comparison of the top and bottom cutters in Fig. 1 of the drawing.

In the mounting of the retractible cutters 2, since they must be free to slide in the tool stock to permit their adjustment to different diameters it is difficult to support them with absolute accuracy in their true positions. Thus if a particle of dirt or other foreign matter gets under the inner edge of a cutter the latter is slightly cocked or thrown out of its true position. This is much more likely to occur toward the rear edge of the cutter because the supporting parts engaging the rear ends of the cutters are somewhat less accessible and more difficult to keep perfectly clean. From an inspection of Fig. 2 it will be seen that if the rear ends of the cutters were in some such manner thrown outward the teeth 2d, 2d' of the cutters would tend to cut too deeply and would be likely to produce a rough finish. To obviate this result the teeth of the zone E are formed upon the pitch line e inclining rearward and away from the pitch line a of the thread and of the teeth 2d, 2d', with the result that said teeth 2e are moved slightly outward by the cocking of the cutter into position to effect an exceedingly light smoothing cut on the thread.

The trailing teeth 2e of the zone E have a further advantage. After prolonged use of the cutter the finishing tooth or teeth of the zone D of the cutter become worn and are no longer capable of forming the thread true to form and with an entirely smooth finish. When that occurs, the cutter can be adjusted outward (or inward if the tool is a die) a litle farther than previously for a thread of given diameter so as to bring the first of the trailing teeth 2e into the correct radial position to act as the finishing tooth of the cutter. Said tooth 2e, having been subject to less wear than the tooth 2d, is now adapted effectively to perform the finishing cut.

The inclination of the pitch line e to the pitch line a should be slight and such that the teeth 2e can function as stated in the last two preceding paragraphs when the rear ends of the cutters are set or adjusted in the manner described.

It will be understood that the provision of teeth formed and arranged like the teeth 2e is a feature that is not limited in its application to cutters of the specific construction of the cutters 2.

In carrying out my invention the depths of cut suitable for the teeth of zone C and for the teeth of zone D, as will be appreciated by those familiar with such machine tool operations as thread cutting, will vary with the cutting or machining characteristics of the material to be threaded, the number of cutters with which the tool is provided, the number of threads per inch and the taper on which the thread is formed. Practically speaking, the maximum depth of cut in either zone should be small enough to give satisfactory results with the smallest number of cutters to be used. With my improved cutter, constructed as shown in Fig. 2, the depths of cut both of the teeth 2c and of the leading tooth 2d are determined chiefly by the inclination of the pitch line of the teeth 2c to the pitch line of the teeth 2d, though the total amounts of metal removed by the teeth 2c are, of course, affected also by the depth to which they are truncated.

While it is impossible to lay down a generally applicable rule as to depth of cut, as illustrative of what I consider good practice in carrying out my invention it may be stated that for the production of threads of 8 pitch and ¾" diameter taper per foot on the ordinary run of steel pipe, assuming the use of a single cutter, satisfactory results are obtained by forming the cutter with the pitch line of the teeth 2c at such an angle to the pitch line of the teeth 2d that the difference between the radial distance from the axis of the thread to the common root of the last two teeth 2c and the radial distance from the axis of the thread to the common root of the last tooth 2c and the first tooth 2d is .0009". It will be understood that this latter figure is subject to substantial variation in carrying out my invention. Also where more than one cutter is employed or where the number of threads per inch is increased or where the taper of the thread cut is increased, the said difference in radial dimensions can be increased and, conversely, it can be decreased if the number of threads per inch or the taper of the thread is decreased. Obviously deeper cuts can be made satisfactorily when the material to be threaded cuts easily and cleanly than when it is tough and tends to tear.

In the broader aspects of the main feature of my invention, the construction of the cutters 2 can be widely varied. For example, in Fig. 3 I have shown one of the various possible modified forms of construction. Here a coupling A', or a portion thereof, is shown by broken lines and the cutter 12 may be considered as divided into zones G, H, I, and J. The cutter teeth 12i and the half tooth 12i' of the zone I are of full size corresponding to the finished contour of the thread to be formed and are formed upon a pitch line coincident with the pitch line $a'$ of the thread. These teeth are adapted to effect the final finishing cut following the successive cuts effected by the teeth $12h$ of the zone H. These latter teeth are formed with a curved pitch line $c'$ extending toward the cutter axis forward and away from the pitch line $a'$ and differ both in width and height, with the smallest tooth leading and with the largest one immediately preceding the teeth of zone I. The smaller of these teeth are truncated but have round corners instead of the sharp corners of the teeth $2c$ of the cutter 2. Also the teeth of zone H have their tips or crests and their roots on lines that are curved instead of straight as in the case of cutter 2, thus further illustrating the wide variety of forms which the cutter teeth may have in carrying out my invention. These curved lines of the crests and roots of the teeth of zone H, like the pitch line $c'$, extend forward toward the cutter axis and away from the pitch line of the teeth of zone I. As in the case of the cutters 2 first described, none of the teeth of zone H, except possibly the rear side of the highest tooth of said zone, cuts to the finished contour of the thread though the largest of these teeth closely approaches that contour so that the final finishing cut, effected by the teeth of zone I, is an exceedingly light one, just as in the case of the cutters 2.

The zone G of the cutter affords an advance cutting edge $12g$ which cuts away the stock of the work in advance of the first cutting tooth of the zone H.

Zone J of the cutter is formed with full size cutting teeth $12j$ and half tooth $12j'$ which, however, are formed on a pitch line $e'$ which extends toward the axis of the cutter rearward and away from the pitch line of the thread and of the teeth of the zone I. The pitch line $e'$ may be curved or straight, but in the construction shown is straight.

Figure 3:
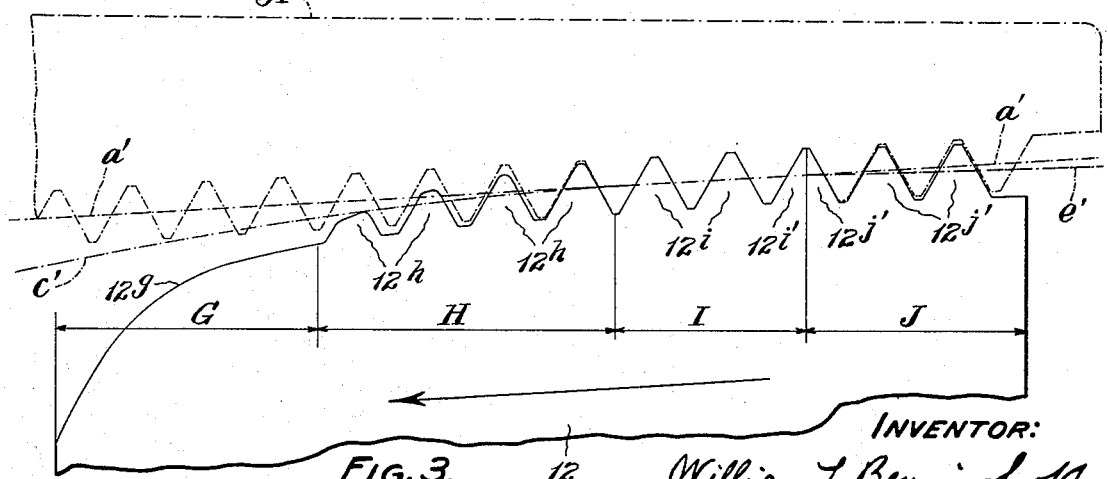
Fig. 3 is a fragmentary side elevation on an enlarged scale of a modified form of cutter.

In Fig. 3, as in the case of Fig. 2, the arrow indicates the direction of feed of the cutter.

It is believed that the operation of the cutter shown in Fig. 3 will be clear without further comment or explanation.

In the foregoing description and in the drawing I have shown only the main elements of the tool in which the cutters are mounted since retractible cutters for cutting taper threads have long been known and used and, as will readily be understood, my invention may be embodied in retractible cutter tools of any of the known constructions in which provision is made for feeding the cutter or cutters on lines parallel to the taper of the thread to be cut. Such tools often are provided with means for effecting a rapid retraction or collapse of the cutters at the end of the cutting operation so as to facilitate disengagement of the tool from the work. Obviously such well known devices may be employed in connection with my invention.

It will be obvious, too, that any suitable number of cutters, from one upward, can be employed. Where but one cutter is employed, it must, of course, be provided with at least one full tooth designed to effect the finishing cut of the thread. Where two or more cutters are employed, the finishing cut can be divided between teeth of the different cutters. Obviously the number of teeth provided for effecting the preliminary cuts in advance of the finishing cut may be varied in number as well as in form and size. Similarly the number of the cutter teeth following the teeth effecting the finishing cut, for example the teeth of the zone E in Fig. 2, may vary in number. Indeed insofar as the main feature of the present invention is concerned, the zone E of the cutter may be entirely omitted.

It has been pointed out in connection with Fig. 3 that the pitch lines of the teeth of zones H and J may be curved. It should be added that the tooth pitch line of the zone that effects the finishing cut (zone I in Fig. 3) also may be a curved line if the tool employs a sufficient number of cutters that each cutter need have but one full size tooth (or portion thereof) for effecting the finishing cut, the said finishing cut being divided between teeth of the different cutters.

While I have shown a standard form of screw thread in explaining the invention, it will be understood that the invention is applicable to the cutting of taper threads of any form.

From what has been said it will be apparent that the specific constructions which have been illustrated in explaining the invention can be modified or varied widely in carrying out the invention as defined in the appended claims.

What I claim is:

1. In a tool for cutting taper threads, the combination of a cutter comprising a body, at least one cutting tooth on the body of a size and form adapted to cut the thread to its finished form in at least some part of its contour, and a plurality of cutting teeth on the body arranged in advance of the first mentioned tooth in a series extending lengthwise of the axis of the thread formed by the tool, the teeth of said series differing in size so as to penetrate, from the first to the last tooth, successively deeper into the work and being formed so that they make cuts sufficiently light to prevent metal piling up on the cutting edges of the teeth and gouging through the contour of the finished thread and so that the highest tooth of said series closely approaches but does not reach any part of said thread contour and leaves a still lighter finishing cut yet to be made; means for operatively supporting the cutter; and means for effecting throughout the thread-forming operation a relative feeding movement of the cutter and the work corresponding to the pitch of the thread to be formed and on lines parallel to the taper of the thread.

2. In a tool for cutting taper threads, the combination of a cutter comprising a body, at least one cutting tooth on the body of a size and form adapted to cut the thread to its finished form in at least some part of its contour, and a plurality of cutting teeth on the body arranged in advance of the first mentioned tooth in a series extending lengthwise of the axis of the thread formed by the tool, the teeth of said series differing in size so as to penetrate, from the first to the last tooth, successively deeper into the work and being formed so that they make cuts sufficiently light to prevent metal piling up on the cutting edges of the teeth and gouging through the contour of the finished thread and so that the highest tooth of said series closely approaches but does not reach any part of said thread contour and leaves a still lighter finishing cut yet to be made; means for operatively supporting the cutter; and means other than the cutter teeth for effecting throughout the thread-forming operation a relative feeding movement of the cutter and the work corresponding to the pitch of the thread to be formed and on lines parallel to the taper of the thread.

3. In a tool for cutting taper threads, the combination of a cutter comprising a body, at least one cutting tooth on the body of a size and form adapted to cut the thread to its finished form in at least some part of its contour, and a plurality of cutting teeth on the body arranged in advance of the first mentioned tooth in a series extending lengthwise of the axis of the thread formed by the tool, the teeth of said series having a pitch line extending forward and away from the pitch line of the finished thread so that said teeth penetrate, from the first to the last tooth, successively deeper into the work and are formed so that they make cuts sufficiently light to prevent metal piling up on the cutting edges of the teeth and gouging through the contour of the finished thread and so that the highest tooth of said series closely approaches but does not reach any part of said thread contour and leaves a still lighter finishing cut yet to be made; means for operatively supporting the cutter; and means other than the cutter teeth for effecting throughout the thread-forming operation a relative feeding movement of the cutter and the work corresponding to the pitch of the thread to be formed and on lines parallel to the taper of the thread.

4. In a tool for cutting taper threads, the combination of a cutter comprising a body, at least one cutting tooth on the body of a size and form adapted to cut the thread to its finished form in at least some part of its contour, and a plurality of cutting teeth on the body arranged in advance of the first mentioned tooth in a series extending lengthwise of the axis of the thread formed by the tool, the teeth of said series differing in height and having a pitch line extending forward and away from the pitch line of the finished thread so that said teeth penetrate, from the first to the last tooth, successively deeper into the work and are formed so that they make cuts sufficiently light to prevent metal piling up on the cutting edges of the teeth and gouging through the contour of the finished thread and so that the highest tooth of said series closely approaches but does not reach any part of said thread contour and leaves a still lighter finishing cut yet to be made; means for operatively supporting the cutter; and means other than the cutter teeth for effecting throughout the thread-forming operation a relative feeding movement of the cutter and the work corresponding to the pitch of the thread to be formed and on lines parallel to the taper of the thread.

5. In a tool for cutting taper threads, the combination of a cutter comprising a body, at least one cutting tooth on the body of a size and form adapted to cut the thread to its finished form in at least some part of its contour, and a plurality of cutting teeth on the body arranged in advance of the first mentioned tooth in a series extending lengthwise of the axis of the thread formed by the tool, the teeth of said series being of substantially the same thickness as the first mentioned tooth and having a pitch line extending forward and away from the pitch line of the finished thread so that the teeth of said series penetrate, from the first to the last tooth, successively deeper into the work and are formed so that they make cuts sufficiently light to prevent metal piling up on the cutting edges of the teeth and gouging through the contour of the finished thread and so that the highest tooth of said series closely approaches but does not reach any part of said thread contour and leaves a still lighter finishing cut yet to be made; means for operatively supporting the cutter; and means other than the cutter teeth for effecting throughout the thread-forming operation a relative feeding movement of the cutter and the work corresponding to the pitch of the thread to be formed and on lines parallel to the taper of the thread.

6. In a tool for cutting taper threads, the combination of a cutter comprising a body, at least one cutting tooth on the body of a size and form adapted to cut the thread to its finished form in at least some part of its contour, and a plurality of cutting teeth on the body arranged in advance of the first mentioned tooth in a series extending lengthwise of the axis of the thread formed by the tool, the teeth of said series being of substantially the same thickness as the first mentioned tooth and truncated on lines extending forward and away from the pitch line of the first mentioned tooth and having a pitch line extending forward and away from the pitch line of the finished thread so that the teeth of said series penetrate, from the first to the last tooth, successively deeper into the work and are formed so that they make cuts sufficiently light to prevent metal piling up on the cutting edges of the teeth and gouging through the contour of the finished thread and so that the highest tooth of said series closely approaches but does not reach any part of said thread contour and leaves a still lighter cut yet to be made; means for operatively supporting the cutter; and means other than the cutter teeth for effecting throughout the thread-forming operation a relative feeding movement of the cutter and the work corresponding to the pitch of the thread to be formed and on lines parallel to the taper of the thread.

7. In a tool for cutting taper threads, the combination of a plurality of cutters each comprising a body, at least one cutting tooth on the body of a size and form adapted to cut the thread to its finished form in at least some part of its contour, and a plurality of cutting teeth on the body arranged in advance of the first mentioned tooth in a series extending lengthwise of the axis of the thread formed by the tool, the teeth of said series being formed and arranged to penetrate, from the first to the last tooth, successively deeper into the work and so that they make cuts sufficiently light to prevent metal piling up on the cutting edges of the teeth and gouging through the contour of the finished thread and so that the highest tooth of said series closely approaches but does not reach any part of the said thread contour and leaves a still lighter finishing cut yet to be made; means for operatively supporting the cutters in a circumferential series with the teeth of the several cutters spirally tracked; and means other than the cutter teeth for effecting throughout the thread-forming operation a relative feeding movement of the cutters and the work corresponding to the pitch of the thread to be formed and on lines parallel to the taper of the thread.

8. In a tool for cutting taper threads, the combination of cutting means comprising at least one cutting tooth of a size and form adapted to cut the thread to its finished form in at least some part of its contour, a plurality of cutting teeth arranged in advance of the first mentioned tooth in a series extending lengthwise of the axis of the thread to be formed, the teeth of said series being truncated on line inclined forward and away from the pitch line of the finished thread and having a pitch line extending forward and away from the pitch line of the finished thread so that the teeth of said series penetrate, from the first to the last tooth, successively deeper into the work and being formed so that they make cuts sufficiently light to prevent metal piling up on the cutting edges of the teeth and gouging through the contour of the finished thread and so that the highest tooth of said series closely approaches but does not reach any part of the said thread contour and leaves a light finishing cut yet to be made, and means in advance of the leading truncated tooth of the said series having a cutting edge which immediately in advance of the top cutting edge of said leading tooth is in alignment with said edge; means for operatively supporting the said cutting means; and means other than the cutter teeth for effecting throughout the thread-forming operation a relative feeding movement of the cutting means and the work corresponding to the pitch of the thread to be formed and on lines parallel to the taper of the thread.

9. In a tool for cutting threads, the combination of a cutter comprising a body, cutting teeth on the body formed and arranged normally to cut a thread to its finished form in at least some part of its contour, and at least one tooth on the body following the other teeth, said following tooth having dimensions of thickness and height corresponding to the finished form of the thread but being formed with respect to a pitch line extending at such an inclination rearwardly and away from the pitch line of the thread cut by the device that outward adjustment of the rear end of the cutter in proportion to wear of the preceding finishing tooth of the cutter adapts the said following tooth to effect a finishing cut; and a support upon which the cutter is adjustably mounted for movement inward and outward in relation to the tool axis.

10. In a tool for cutting threads, the combination of a cutter comprising a body, at least one cutting tooth on the body of a size and form adapted normally to cut the thread to finished form in at least some part of its contour, a plurality of cutting teeth on the body arranged in advance of the first mentioned tooth in a series extending lengthwise of the axis of the thread formed by the tool, the teeth of said series differing in size so as to penetrate, from the first to the last tooth, successively deeper into the work and being formed so that they make cuts sufficiently light to prevent metal piling up on the cutting edges of the teeth and gouging through the contour of the finished thread and so that the highest tooth of said series closely approaches but does not reach any part of said thread contour and leaves a still lighter finishing cut yet to be made, and at least one tooth on the body following the aforesaid teeth and having dimensions of thickness and height corresponding to the finished form of the thread but being formed with respect to a pitch line extending at such an inclination rearwardly and away from the pitch line of the thread cut by the device that outward adjustment of the rear end of the cutter in proportion to wear of the preceding finishing tooth of the cutter adapts the said following tooth to effect a finishing cut; and a support upon which the cutter is adjustably mounted for movement inward and outward in relation to the tool axis.

WILLIAM L. BENNINGHOFF.